United States Patent [19]

Herbin et al.

[11] 4,246,354

[45] Jan. 20, 1981

[54] PROCESS FOR BROMINATION OF RESINS BASED ON CROSSLINKED VINYLAROMATIC COPOLYMERS

[75] Inventors: Jean E. E. Herbin; Jean de Koker; Patrick J. B. Prsle, all of Chauny; Marc S. A. Giuliani, Tergnier; Teddy E. A. Drode, Chauny; Jacques L. Boutier, Chauny; Paul D. A. Grammont, Chauny, all of France

[73] Assignee: Diamond Shamrock Corporation, Dallas, Tex.

[21] Appl. No.: 42,784

[22] Filed: May 29, 1979

[30] Foreign Application Priority Data

May 31, 1978 [FR] France .................. 78 16244

[51] Int. Cl.³ .......... C08F 8/20; C08F 8/30; C08F 8/36; C08J 5/20
[52] U.S. Cl. .................. 521/32; 521/33; 521/55; 525/332; 525/344; 525/355; 525/356; 525/357; 525/379
[58] Field of Search .............. 521/32, 33, 55; 525/332, 356, 357, 344, 355, 379

[56] References Cited

U.S. PATENT DOCUMENTS

| 2,614,099 | 10/1952 | Bauman et al. | 525/356 |
| 2,788,331 | 4/1957 | Greer et al. | 525/356 |
| 3,009,906 | 11/1961 | Eichhorn et al. | 525/356 |
| 3,337,480 | 8/1967 | Small | 521/33 |
| 3,342,755 | 9/1967 | Calmon et al. | 521/33 |

FOREIGN PATENT DOCUMENTS 765165 8/1976 South Africa .
1034051 6/1966 United Kingdom .

*Primary Examiner*—Harry Wong, Jr.
*Attorney, Agent, or Firm*—William A. Skinner

[57] ABSTRACT

This invention relates to a process for the preparation of high density resins by bromination of particles of crosslinked vinylaromatic copolymers of either the gel type or the ionic or non-ionic macroporous type. The invention is characterized in that crosslinked vinylaromatic polymer particles which have been swollen in a solvent are contacted with bromine or a bromine releasing agent in the presence of an oxidizing agent.

13 Claims, No Drawings

PROCESS FOR BROMINATION OF RESINS BASED ON CROSSLINKED VINYLAROMATIC COPOLYMERS

FIELD OF THE INVENTION

This invention relates generally to a process for the preparation of high density resins from particulate crosslinked vinylaromatic copolymers. More particularly the process involves the preparation of high density ion exchange resins and ionic or non-ionic adsorbent resins.

BACKGROUND OF THE INVENTION

A variety of resins having different applications can be prepared from particles of vinylaromatic copolymers of the gel or macroporous type. These include anion exchange resins of differing basicity prepared by chlorination and/or chloromethylation of the copolymers followed by amination, and cation exchange resins prepared by sulfonation of the copolymers using agents such as sulfuric acid and sulfuric anhydride. Also included are ionic and non-ionic decolorizing adsorbent resins.

For various applications of these resins, such as the separation of uranium from leach liquors or the regeneration of resins used in water treatment, it is advantageous to have resins having a density higher than that of commercially available resins, while retaining a good exchange capacity. In French Pat. No. 2,362,886 it is proposed to prepare high density resins of the ionic type by bromination of certain aromatic polymers.

SUMMARY OF THE INVENTION

It is an object of the present invention to provide an improved process for the preparation of high density or "heavy" resins by bromination of crosslinked vinylaromatic copolymers.

The process according to the invention is characterized by the bromination of particles of crosslinked vinylaromatic copolymers which have been previously swollen in a solvent, using bromine or a bromine releasing agent in the presence of an oxidizing agent.

DETAILED DESCRIPTION OF THE INVENTION

In the practice of the invention, any copolymer of the vinylaromatic type can be used for the preparation of resins. These copolymers are generally prepared by suspension polymerization of a monovinylaryl compound such as styrene and at least one di- or polyvinylaryl compound such as divinylbenzene. These copolymers are in the form of particles having a size ranging from about 0.25 to about 1.1 mm and a density from about 1.05 to about 1.15.

Solvents such as dichloroethane can be used for swelling the vinylaromatic copolymers. Dichloroethane is a good swelling agent for copolymer particles and also a good carrier of bromine.

The bromination agent may be bromine or bromine releasing agents such as metal bromides, and particularly alkali bromides which release bromine in the presence of oxidizing agents. The bromination reaction is generally carried out at temperatures between about 20° and 60° C.

As oxidizing agents, materials such as metal peroxides, nitric acid, and sulfuric acid can be used in sufficient quantity to oxidize the hydrobromic acid evolved during the reaction to bromine. This enables one to not only avoid the evolution of hydrobromic acid, but more importantly to reduce the required quantity of bromine by half.

In addition, we have discovered that the more advantageous resins are obtained by monobromination of the aromatic rings of crosslinked vinylaromatic copolymers. Monobromination yields a noticeable increase in density without reducing the possibility for further fixation of functional groups, whereas a dibromination decreases the reactivity of the copolymer. This monobromination can be obtained by the action of half a molecule of bromine (bromide ion) per aromatic ring of the vinylaromatic copolymer. Further, the bromination reaction is advantageously carried out in the presence of a catalyst such as iron, preferably ferrous sulfate.

A particularly advantageous procedure is bromination with half a molecule of bromine per aromatic ring in the presence of an excess of sulfuric acid as oxidizing agent and of ferrous sulfate as catalyst in a quantity of $\frac{1}{4}$ to 1/100 molecule per aromatic ring. In this way resins can be prepared having the desired density while using the minimum of bromine and avoiding the formation of hydrobromic acid.

The following examples illustrate the invention.

EXAMPLE 1

Into three different flasks are introduced, with stirring, 52 g of a bead copolymer of styrene crosslinked with 3% of pure divinylbenzene (the beads having a median size of 55 mm and a 1.10 density) and 200 ml of dichloroethane. The copolymer is allowed to swell and catalyst is introduced at different concentrations into each flask:

(a) iron (0.01 mole)+sulfuric acid (0.5 mole);
(b) iron (0.01 mole)+sulfuric acid (1.0 mole);
(c) iron (0.01 mole)+sulfuric acid (2.0 moles).

Then 26 ml of bromine are introduced at 30° C. over two hours. After introduction of bromine, the temperature is increased to 40° C. and maintained at this level for four hours.

The beads are washed with alcohol, dried, then chloromethylated and aminated as follows. The brominated beads are introduced into a stirred flask into which at ambient temperature is added 44 ml of methylene chloride, 150 ml of chloromethyl methyl ether, and (over 1 hour, 30 minutes) 88 ml of a 99.5% solution of commercial titanium tetrachloride. The temperature is increased to 40° C. and maintained for 6 hours, 30 minutes. The chloromethylated beads are washed with alcohol and drained. The amination is conducted in a stirred flask containing 50 ml distilled water, 100 ml methylal, and 60 g of trimethylamine in a 250 g/l solution. The mixture is held for 1 hour, 30 minutes at ambient temperature, then the temperature is increased to 40° C. and held there for 4 hours. The beads are washed, filtered, and analyzed. The strong base anion exchange resins thus obtained have the following characteristics.

| Resin | Capacity eq/kg | Moisture % | Density g/ml |
|---|---|---|---|
| a | 3.13 | 42.3 | 1.227 |
| b | 3.07 | 43.0 | 1.227 |
| c | 3.12 | 44.9 | 1.226 |

EXAMPLE 2

Into a flask are introduced, with stirring, 52 g of the copolymer described in Example 1, 25 ml of dichloroethane, 0.01 mole of ferrous sulfate and 150 ml of sulfuric acid (95%). The mixture is maintained at 25° C. for 15 minutes. Then 13 ml of bromine are added over 2 hours at 30° C. After the bromine addition is complete, the temperature is held at 30° C. for 4 hours. The beads of brominated copolymer are washed with methanol and water, then dried. The dried beads are chloromethylated and aminated as in Example 1. A strong base anion exchange resin is obtained with the following characteristics: capacity—3.09 eq/kg; moisture—53.3%; density—1.228 g/ml.

EXAMPLE 3

Into a stirred flask at ambient temperature are introduced 52 g of the copolymer described in Example 1, 0.01 mole of ferrous sulfate, 50 ml of dichloroethane, 59.5 g of potassium bromide and 300 ml of surfuric acid (95%). The temperature is increased to 30°–35° C. and maintained at about 35° C. for six hours. The copolymer beads are separated from the reaction medium, washed with methanol, then water, and dried. They are chloromethylated and aminated as in Example 1. A strong base anion exchange resin is obtained with the following characteristics: capacity—3.06 eq/kg; moisture—50.7%; density—1.219 g/ml.

This example demonstrates that ion exchange resins with the desired qualities are obtained by using a metal bromide in the presence of an oxidizing agent as the brominating agent for a copolymer based on styrene-divinylbenzene.

All of the preceding examples relate to the preparation of strong base anion exchange resins. However, it is clear that by judicious choice of the amine during the amination step, it is possible to obtain weak base anion exchange resins. It is also clear that this bromination process may be used for the manufacturing of strong acid cation exchange resins or adsorbent and decolorizing resins (ionic or non-ionic) having high densities.

As a non-limiting example, the preparation of a strong acid cation exchange resin is shown below. In this process sulfuric acid serves in one part as an oxidizing agent during the bromination and in the other part as a sulfonation agent. The sulfonation is carried out directly in the initial mixture by increasing the temperature.

EXAMPLE 4

Into a flask are introduced, with stirring, 52 g of a copolymer of styrene crosslinked with 8% of divinylbenzene, 100 ml of dichloroethane, 200 ml of sulfuric acid (96%) and 1.7 g of ferrous sulfate (0.01 mole). Then 13 ml of bromine are added at 35° C. over 2 hours. This temperature is then maintained for 8 hours, following which the temperature is increased to 80° C. at reflux and so kept for 6 hours. During this operation the excess of sulfuric acid results in sulfonation of the resin. A strong acid cation exchange resin is obtained with the following characteristics, compared with a non-brominated strong acid cation exchange resin:

|  | Capacity eq/l | Capacity eq/kg | Density g/ml |
| --- | --- | --- | --- |
| Non-brominated | 2.0 | 4.3 | 1.30 |
| Brominated | 1.85 | 3.6 | 1.45 |

The foregoing examples are given to illustrate the invention and are not intended to be limiting. They show that the bromination process of the invention yields ion exchange resins and/or ionic or non-ionic adsorbent and decolorizing resins of the gel or macroporous type having high density, while minimizing the consumption of bromine and avoiding the undesirable formation of hydrobromic acid. These so-called "heavy" resins are particularly well suited for application in ion exchange, decolorization, adsorption, extraction, and separation or organic or inorganic compounds from pulp solutions, using a fluidized bed technique.

What is claimed is:

1. A process for the preparation of high density resins by bromination of particles of crosslinked copolymers of a monovinylaryl compound and at least one di- or poly-vinylaryl compound, of the gel or macroporous type, ionic or non-ionic, characterized in that the copolymer is swollen in a solvent and then is selectively mono-brominated on the aromatic rings of the copolymer using bromine or a bromine releasing agent in the presence of an oxidizing agent to add half a molecule of bromine per aromatic ring.

2. A process according to claim 1 wherein the bromine releasing agent is an alkali metal bromide.

3. A process according to claim 1 wherein the oxidizing agent is sulfuric acid.

4. A process according to claim 1 wherein the bromination is conducted in the presence of a catalyst.

5. A process according to claim 4 wherein the catalyst is ferrous sulfate.

6. A process according to claim 1 wherein the copolymer is chloromethylated and aminated following the bromination.

7. A process according to claim 1 wherein the copolymer is sulfonated following the bromination.

8. A process according to claim 7 wherein the sulfonation is conducted using an excess of the sulfuric acid originally introduced as an oxidizing agent.

9. A process for the preparation of high density resins by bromination of particles of crosslinked copolymers of a monovinylaryl compound and at least one di- or poly-vinylaryl compound, characterized in that the copolymer is swollen in dichloroethane, then is mono-brominated by the addition of half a molecule of bromine per aromatic ring using bromine or a bromine releasing agent in the presence of an excess of sulfuric acid and ¼ to 1/100 molecule of ferrous sulfate per aromatic ring.

10. A process according to claim 9 wherein the copolymer is chloromethylated and aminated following the bromination.

11. A process according to claim 9 wherein the copolymer is functionalized by sulfonation following the bromination.

12. A high density resin prepared by the process of claim 1.

13. The resin of claim 12 wherein the density is greater than about 1.05.

* * * * *